June 30, 1953     J. R. CURRAN     2,643,676
CONTROL MECHANISM FOR RELIEF VALVES
Filed April 19, 1948
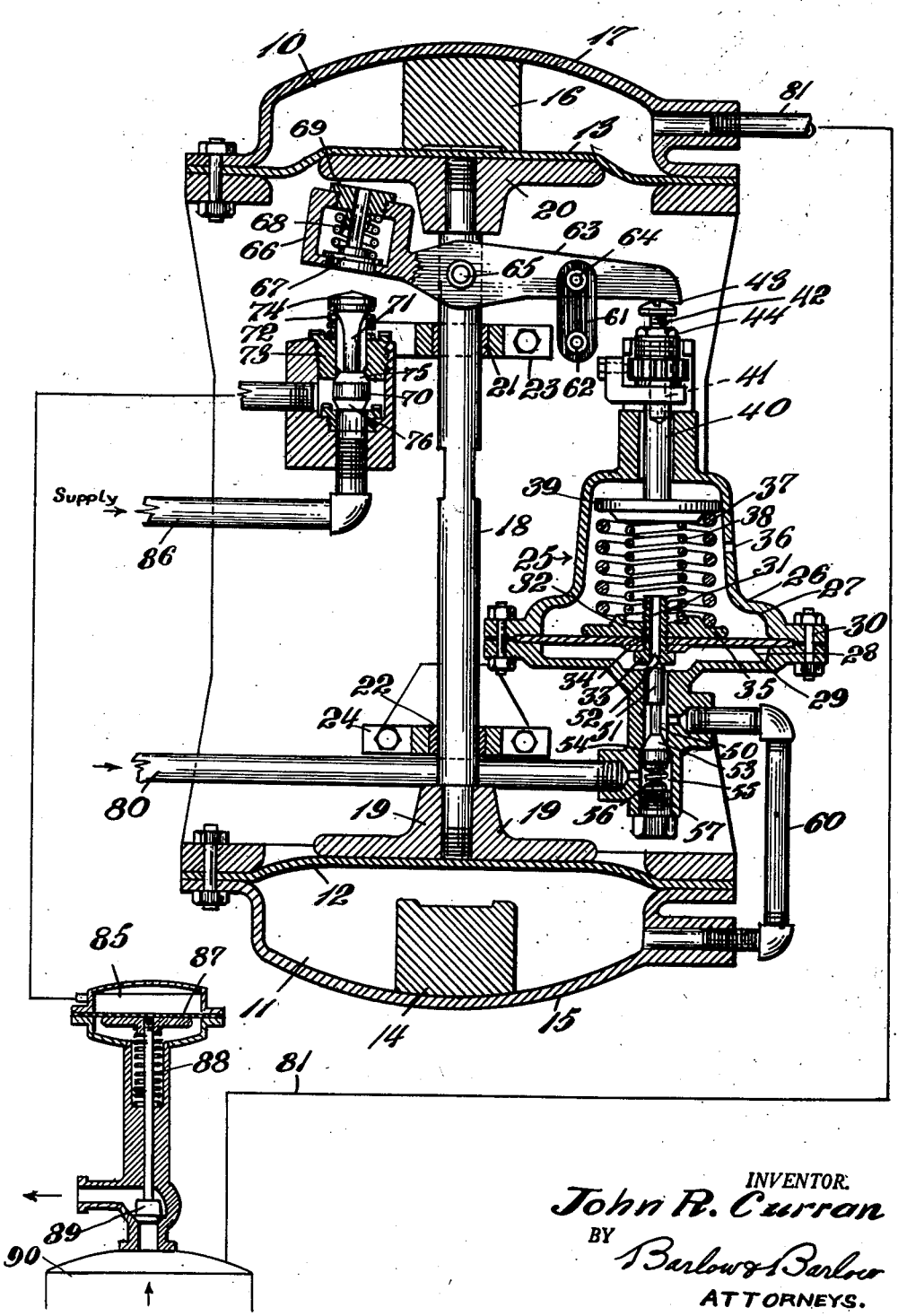
INVENTOR.
John R. Curran
BY Barlow & Barlow
ATTORNEYS.

Patented June 30, 1953

2,643,676

UNITED STATES PATENT OFFICE 2,643,676

CONTROL MECHANISM FOR RELIEF VALVES

John R. Curran, Greenwood, R. I., assignor, by mesne assignments, to Reconstruction Finance Corporation, Boston, Mass., a corporation of the United States Application April 19, 1948, Serial No. 21,997

12 Claims. (Cl. 137—658)

This invention relates to a pilot-operated relief valve.

Heretofore it has been usual in the operation of relief valves of the conventional type for the excessive pressure which is to be relieved to actuate or move a spring-loaded valve so as to act against the spring pressure in the valve, the relief occurring when the pressure to be relieved overcomes the spring. Valves of this character are usually heavy in weight when in the large sizes, and their operation is not predictable. These valves are usually limited in capacity because of the pressures involved. Further, in the conventional type of valve, when the pressure gets to a point where it is to open the valve the forces are in nearly equilibrium, and the force to close the valve is very small, especially if liquids or fluids which are operated upon have entrained solids in them. Further, it is very difficult to close a valve with pressure where the liquids are heavy or some catalysts are suspended in the liquid which is to be controlled.

Leaks may occur, and these leaks cause excessive wear and are very disastrous, especially where the catalysts carried are of an abrasive character.

One of the objects of this invention is to provide a quick-acting valve.

Another object of this invention is to provide a valve which is sensitive to fluid pressure, but one in which there will be a substantial pressure applied on the valve as it is moved in one direction or the other.

Another object of the invention is to provide an arrangement so that the closing plug of the valve is never in a state of equilibrium, and thus it may have substantial pressures applied to it so as to tightly close the valve as may be desired.

Another object of this invention is to provide a valve which may be of a much larger size than relief valves heretofore have been produced.

Another object of this invention is to provide an arrangement so that a spring pressure need not be relied upon for moving the valve.

Another object of this invention is to provide an arrangement so that a regenerative effect may be provided; that is, when the valve starts to operate the forces which will occur will further cause the valve to move in the direction it has started rather than to resist it and thus the valve will have a snap action in moving to position.

With these and other objects in view, the invention consists of certain novel features of construction as will be more fully described and particularly pointed out in the appended claims.

The figure in the drawing illustrates a sectional view showing the valve actuator which is the subject of this invention with diagrammatic arrangement of the tank and protecting relief valve.

In proceeding with this invention, I provide a pair of opposed fluid chambers each with a movable member, with the movable members connected together so that as one fluid chamber enlarges, the other fluid chamber contracts, or is made smaller.

An arrangement is provided for maintaining one of the fluid chambers at the pressure at which it is desired relief shall occur, which pressure is maintained by a regulator. The pressure is transmitted by the spring serving to determine the pressure at which the chamber will be maintained. A connection to an abutment for the spring moves in response to the rod connecting the movable parts of the main opposed chambers, whereby a control is had so that if the pressure which is to be governed exceeds the pressure of the chamber which is being maintained at the desired relief pressure, a movement of the diaphragms or other movable parts occurs, and as movement initially occurs, the spring pressure which exercises the control is relieved in a regenerative effect so that a much quicker action in response to the higher pressure occurs causing the movement of the rod which connects the two diaphragms to be very rapid. Some arrangement is connected to this rod so that it will respond to the rod movement to operate a valve which will vent the tank or other work to be protected so that a relief of pressure will occur.

With reference to the drawings, I provide two opposed fluid chambers designated 10 and 11 which may take such forms as bellows, chamber and piston, or a diaphragm such as here shown, there being in connection with the first chamber 10 a movable diaphragm 13 and in connection with the second chamber 11 a movable diaphragm 12. Each diaphragm is limited in its movement, such for instance as by a stop 14 being secured to the fixed wall 15 to limit the movement of the diaphragm 12 toward this wall while a stop 16 is formed on the wall 17 to limit the movement of the diaphragm 13 toward this wall 17. A rod 18 is fixed at one end to diaphragm 12 as by the member 19 and is fixed at the other end to the diaphragm 13 as by the member 20. The rod is guided in its movement by oil impregnated bushings 21 and 22 held in position as at 23 and 24.

A control unit designated generally 25 is provided for the chamber 11. This consists of a casing 26 which is divided into a spring chamber 27 and a third fluid chamber 28 by a diaphragm 29, which is held in place between two parts of the casing by bolts 30. The diaphragm is provided with a central opening 31 through the threaded tube 32 which is held in place on the diaphragm by reason of the head 33 engaging washer 34 and a nut 35 on the other side of the diaphragm. The spring chamber is vented as at 36 and is provided with a pair of springs 37 and 38 which abut against the nut 35 at one end and against the abutment plate 39 at the other end. This plate 39 is connected to rod 40 which extends outwardly through the casing. This rod 40 has an internally threaded upper end 41 and a threaded plug 42 inserted in this recess which is provided with a head 43 and is held in position by nut 44 for adjustment purposes.

The air chamber 28 has its bottom wall so shaped as to provide a conduit 50 through which a plug 51 extends having a conical end 52 to enter the passage 31 through the diaphragm and close it, when the diaphragm is pressed against it. This plug also has another conical portion 53 to engage a valve seat 54 formed between the conduit 50 and the larger bore 55 of this conduit.

A spring 56 serves to press this plug 51 upwardly and acts against the closure 57 in the end of this conduit.

The upper portion of this plug 51 provides a passage about it into the air chamber 28, and a conduit 60 extends from the chamber 11 to a point above the valve seat 54 and into the conduit 50 so as to communicate with the chamber 28. The pressure in the chamber 11 may be adjusted by the pressure on the springs 37 and 38 and will be the set at the pressure for protection of the work.

Link 61 is secured to a fixed pivot 62 and is connected with a lever 63 as at 64 which is in an equivocal relation therewith, while the lever 63 is fixedly pivoted on the rod 18 as at 65, and the outer end of this lever carries a head 66 with a spring-mounted abutment plate 67 which plate may be resiliently pressed by a spring 68 acting against a cap 69 which is threaded into the head 66.

A valve plug which is to be controlled is designated 70 and is urged upwardly through its stem 71 by a spring 72 acting between the threaded member 73 and a head 74. This valve has an upper conical seat 75 and a lower conical seat at 76.

Air pressure is supplied through conduit 80 to a point below the valve plug 53, this valve plug closing when the desired amount of pressure which is the value at which the relief is to occur is present in the chamber 11. If this pressure is not present in the chamber 11, then movement of the diaphragm will cause the valve 53 to open so as to admit pressure into this system which comprises the air chamber 28 and the chamber 11 until there is present in this chamber the pressure which it is desired shall be that at which relief occurs. This will cause the rod 18 to be moved upwardly to the position as shown in the drawing.

The conduit 81 connects to the tank 90 or other device which is to be protected and should there occur in this tank an excess pressure, beyond that which it is desired the tank should hold, then this pressure will enter the chamber 10 and will start to force the diaphragm 13 and the rod 18 downwardly. As this occurs, the lever 63 will rock on its pivot 64 and its end which engages the screw 43 will move away from this screw; consequently permitting less pressure to be exerted on the diaphragm 29 as the spring has now nothing to act against; consequently the diaphragm will move upwardly further relieving the pressure in chamber 11 and thus the rod will move faster downwardly. The further it moves the more is the tendency for it to move because of this arrangement and thus a snap action or quick action will occur and the head 66 will engage the plug 70 moving it from the position shown in full lines to cause the conical portion 76 to seat and at the same time open the conical portion 75 which vents the relief valve chamber 85 to the atmosphere and permits escape of the pressure therein furnished from the supply 86. The diaphragm 87 will then be forced upwardly by spring 88 opening the plug 89 and venting the tank 90.

I claim:

1. A control mechanism comprising a chamber which is subjected to the pressure to be controlled and which has a wall movable in response to pressure in the chamber, a second fluid chamber having a wall movable in response to pressure in its chamber, means to tie the movable walls together so that when one chamber increases its volume by movement of its wall, the other chamber decreases its volume by movement of its wall, a fluid in said second chamber at the pressure at which movement is desired, and means responsive to movement of the wall of the first chamber to vent the second chamber and permit more rapid movement of said first chamber wall.

2. A control mechanism comprising a chamber which is subjected to the pressure to be controlled and which has a wall movable in response to pressure in the chamber, a second fluid chamber having a wall movable in response to pressure in its chamber, means to tie the movable walls together so that when one chamber increases its volume by movement of its wall, the other chamber decreases its volume by movement of its wall, a fluid in said second chamber at the pressure at which movement is desired, a third chamber having a movable wall subjected to the pressure of the fluid in the second chamber, a valve controlled by the movable wall of the third chamber, resilient means acting on said third wall and exerting a pressure at which movement is desired so as to be flexed and open the valve to vent the third chamber when the pressure is increased, and means responsive to movement of the wall of the first chamber to vent the second and third chamber and permit more rapid movement of said first chamber wall.

3. A control mechanism as in claim 1 wherein said means responsive includes a lever on said tie between said walls.

4. A control mechanism as in claim 2 wherein said means responsive includes a lever on said tie between said walls.

5. A control mechanism comprising a chamber which is subjected to the pressure to be controlled and which has a wall movable in response to pressure in the chamber, a second fluid chamber having a wall movable in response to pressure in its chamber, means to tie the movable walls together so that when one chamber increases its volume by movement of its wall, the other chamber decreases its volume by movement of its wall, a fluid in said second chamber at the pressure at which movement is desired, a third chamber having a movable wall subjected to the pressure of the fluid in the second chamber, a valve controlled by the movable wall of the third chamber, resilient means acting on said third wall and exerting a pressure at which movement is desired so as to be flexed and open the valve to vent the third chamber when the pressure is increased, and an abutment for the resilient means carried by said tie between the walls and removable by the initial movement of the wall of the first chamber to permit more rapid movement of the first chamber wall.

6. A control mechanism comprising a chamber having a wall which is movable in response to pressure in the chamber, means operatively connected to said wall for urging the same to contract the volume of said chamber, and valve means operatively connected to said first means and responsive to the initial movement of said wall against the action of said first means to relieve the pressure of said first means and permit more rapid movement of said wall and means operable by said movement to control an air supply conduit.

7. A control mechanism as in claim 6 wherein said urging means is adjustable to the pressure desired for the operation of the wall of said chamber.

8. A control mechanism comprising a chamber which is subjected to the pressure to be controlled and which has a wall movable in response to pressure in the chamber, a shaft connected at one end thereof to said wall for movement therewith, a second pressure chamber having a movable wall connected to the other end of said shaft and subjected to the pressure in said second chamber acting on said wall in a direction to oppose movement of the first said wall under the pressure of its chamber, means for controlling the pressure in said second chamber at a predetermined pressure, a supply control valve, and means connected to said shaft and moved thereby into engagement with said valve for operating the same upon movement of said shaft in response to pressure in the first said chamber exceeding said predetermined pressure.

9. A control mechanism as in claim 8 wherein said movable walls are diaphragms.

10. A control mechanism as it claim 8 wherein said means operated by the position of said shaft is a pressure-operated valve.

11. A control mechanism comprising a pressure chamber subjected to a controlling pressure and having a movable wall subjected on one side thereof to the pressure in said chamber, a shaft connected to said wall and subjected to a pressure to be controlled acting thereon in a direction to apply an opposing force on the other side of said wall, means for controlling the pressure in said chamber at a predetermined pressure, said means including a second movable wall subjected to the pressure in said chamber, resilient means for biasing said second wall against said pressure in said second chamber, and a movable abutment for said resilient means, carried by said shaft and removable upon movement of said shaft in response to the opposing force thereon exceeding said predetermined pressure to permit rapid movement of said second wall in response to the pressure in said chamber.

12. A control mechanism comprising a chamber having a wall which is movable in response to pressure in the chamber, fluid chamber means operatively connected to said wall for urging the same to contract the volume of said chamber, and second means operatively connected to said first means and responsive to the initial movement of said wall against the action of said first means to relieve the pressure of said first means and permit more rapid movement of said wall and means operable by said movement to control an air supply conduit.

JOHN R. CURRAN.

References Cited in the file of this patent

UNITED STATES PATENTS

| Number | Name | Date |
|---|---|---|
| 313,080 | Kaiser | Mar. 3, 1885 |
| 1,425,412 | Norwood | Aug. 8, 1922 |
| 1,678,700 | McEwan | July 31, 1928 |
| 1,680,750 | Smoot | Aug. 14, 1928 |
| 1,698,155 | Dorsey | Jan. 8, 1929 |
| 1,770,912 | Clapp | July 22, 1930 |
| 2,121,433 | Kettunen | June 21, 1938 |